June 27, 1967   E. SCHLUETER   3,327,581

POLYGONAL SHAFTED STUD WITH CORNER GROOVES

Filed March 24, 1965

INVENTOR
ERNEST SCHLUETER

BY *F. R. Jenkins*

AGENT

United States Patent Office 3,327,581
Patented June 27, 1967

3,327,581
POLYGONAL SHAFTED STUD WITH CORNER GROOVES
Ernest Schlueter, 74 Edwards Road, Troy, N.Y. 12180
Filed Mar. 24, 1965, Ser. No. 442,419
4 Claims. (Cl. 85—5)

ABSTRACT OF THE DISCLOSURE

The invention includes a shaft or stem, having a cross section approximating a regular polygon and longitudinal grooves in dihedral edge portions, for loose insertion through a plate provided with a corresponding polygonal hole. Upon a partial turn of the shaft, insufficient to permit withdrawal, a corner groove edge meets a wall of the hole after the opposite edge passes the mid-point of the wall of the hole, to provide a snap-in effect due to slight resilience of the shaft material after deformation of said opposite edge. The shaft may carry a load in snapped in position and can be used to secure a plurality of spaced plates.

---

This invention relates to fastening devices and more particularly to fastener stems or shafts to be anchored in a hole by a partial turn of the stem.

One object is to provide a fastener stem or shaft suitable for being anchored in a hole in plate material without the need for threads or preformed lugs.

Another object is to provide a stem or shaft suitable for being anchored in plate material of various thicknesses without requiring adjusting means to compensate for varying plate thickness.

Another object is to provide a shaft which can be simultaneously secured to spaced plates in one partial turn, irrespective of differences in the spacing of the plates.

Still other objects will be apparent from the disclosure wherein certain usages of the invention are mentioned.

The above objects are attained by a stem, or shaft having three or more lateral side faces of like dimension and terminating laterally at successive like grooves in the stem. The stem cooperates with a plate-like portion of material substantially as hard as that of the stem and having a hole therethrough of the same general size and shape of the cross section of the stem, with the side faces of the stem extended to intersection, and the hole being proportionately larger to allow of easy insertion of the stem into the hole.

In the accompanying drawing showing, by way of example, several of many possible embodiments of the invention, FIG. 1 is substantially a medial longitudinal cross sectional view of the invention in locking position;

The invention is shown in connection with a stud, generally designated 7, turnable by a finger lever 8 secured thereon at a cap portion 9. The stud has a stem or shaft 10, described more fully next below, which may be employed independently of the cap.

Figure 2:
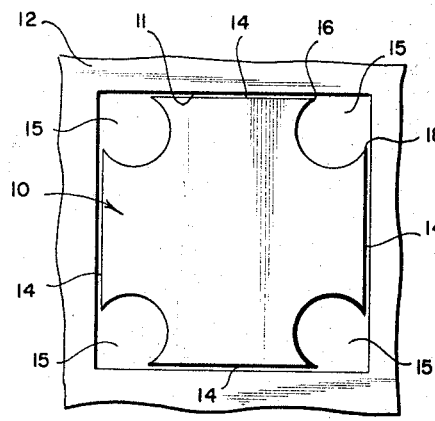
FIG. 2 is a bottom view of the stem of the invention loosely disposed in a square hole in plate material.

In FIG. 2 the stem or shaft 10 as manufactured and before being deformed by use, of generally square or Maltese cross in cross section, as viewed from an end, is shown slightly loosely disposed in a square hole 11 through a sheet or plate 12. The shaft has two pairs of opposite side faces 14 of substantially rectangular shape with four successive longitudinal grooves 15 each between successive side faces. Each groove has opposite acute angle edge portions 16 and 18 where the faces meet the groove, and as shown, the grooves may be with partially cylindrical bottoms.

The shaft is of slightly yieldable material with little elasticity such as plastic or metal such as aluminum.

Figure 3:
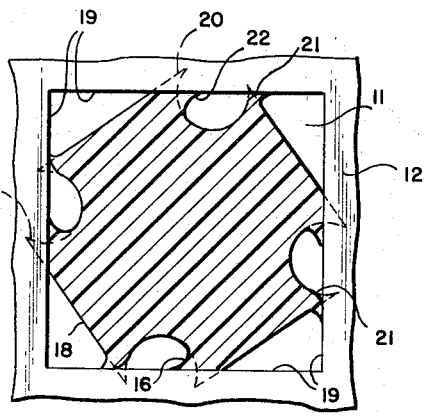
FIG. 3 is a transverse sectional view of the stem in locking position the section being taken substantially along the line 3—3 of FIG. 1, looking in the direction of the arrows of said line.
Figure 4:
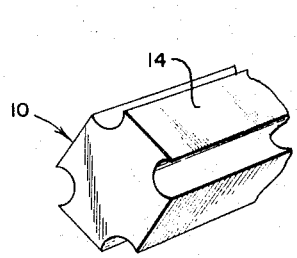
FIG. 4 is a perspective of the stem.
Figure 5:
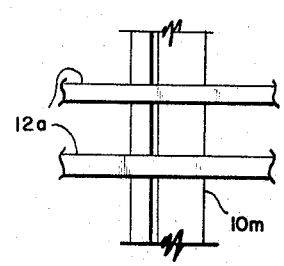
FIG. 5 shows a special use of the stem.

As the shaft 10 of FIG. 2 is turned counter-clockwise the edge portion 16 of each groove bears against each of the respective walls 19 of the hole 11, and this edge portion becomes deformed by flow of the material from the portion 16 into the groove as shown in FIG. 3. Not only is the flow lateral but it is also to a slight extent longitudinal of the shaft axis as shown exaggeratedly as humps 20 behind the plate 12. In any case, the diagonally opposite portions normally 16 extend so that the distance between their outer extremities is greater than the width of the hole with the formation of a consequent transverse slot 20' in edge portions such as 16, so that after the stem has been turned, whether there is actual upsetting or merely the lateral flow relatively clockwise, the material of the shaft projects laterally beyond the walls of the hole to prevent longitudinal motion of the shaft in the hole.

While there may be a very slight tendency for the "stretching" of the material from portion 16 into the groove to tend to turn the shaft backward (clockwise) the major deformation strains and stresses are compressional and approximately radial to the shaft's turning axis. When the deformed edge portions 16 pass the medial zones of the hole walls there is a tendency for compression forces to turn the shaft further in a counter clockwise direction. Further turning brings the edge portions 18 into engagement with the wall to stop the shaft in a "snapped in" position. The apex of the edge portion 18, if sharp, may become slightly blunted as at 21 by the turning to snapping in or dead position.

For "snapping in" position, the effective centers of deformed portions 16 and 18 must engage on opposite sides of the middle of the hole walls. Obtaining this condition of course is dependent on a number of variables, mainly the clearance between the shaft before use of the shaft and the hole walls, the width of the shaft faces 14, the distance between edges on the portions 16 and 18 and the yieldability of the material.

In practice these variables present few difficulties. A plastic composition which when in the form of a strip about 1¼ inches long, ⅛ in. thick and ¼ in. wide, secured at one end can be bent by the thumb and one finger about ⅜ inch out of line with appreciable effort and after being bent returns almost immediately to about ⅛ in. out of line and after some five or ten minutes has only about 1/32 in. out-of-line set, has been found satisfactory under the following condition.

(a) Over-all width of shaft between opposite faces—9/32 in.

(b) Width of faces—6/32 in.

(c) Depth of slots—nearly 2/32 in.

A stud stem made from high impact polystyrene ("Styron 475 by Dow Chemical Co., Midland, Mich.) as described next above operates well when the clearance from the stud walls is sufficient to permit about 2 or 3° of turning play and the plate 12 of aluminum about 1 mm. in thickness, or hard plastic about 3/32 in. thickness. A turn of about 33° to holding position by the fingers acting on the 1½ inch radial lever 8 is easily accomplished and forces formation of rolled-over lips as at 22, with a permanent set, which closes the grooves for about ¾ their width. Holding force of the stem in the hole is sufficient to prevent removal of the stud from the plate longitudinally by the hand and will hold against 25 lbs. force in the axial direction with substantially no movement for at least two minutes. A wooden plate about 7/32 in. in thickness was also satisfactory.

Another sample of the invention was made wherein the shaft 10 and 1/16 inch plate 12 were of 1020 steel and the distance between opposite faces 14 was ½ inch. Appreciable forces was of course required to turn the shaft to the seated position. The proportions of the shaft and hole were similar to those shown in FIG. 2 except that the grooves 15 were slightly deeper and had squared bottoms. There was no noticeable upsetting of the rolled lip on opposite faces of the plate, but the formation of transverse slots in the deformed edges such as 20 were clearly evident as described of FIG. 1. The sharp lip 21 appeared to cut slightly into the plate, but when the shaft was loosened the lip was found to have been dented rather than to cut into the hole wall.

Since seating of the stem or shaft depends on cold flow of the material, the strength of fasteness of the shaft's mounting in the hole is dependent on the nature of the material of the shaft with respect to strength, creep or yield point and the like. Those skilled in the art will be able to cvalculate safe loads relative to forces required for turning the shaft to "snap-in" or "dead" position.

Of course an excessive turning force may result in a sufficient deformation of the edge portion 21 to permit turning a full quarter turn and no locking will be obtained. With only ordinary care this abnormal further turning can be avoided because the trailing edge portion 18 meets the hole wall with much less of a camming action and more as a abutment than does the leading edge portion 16 and a distinct detention is recognized.

Figure 1:
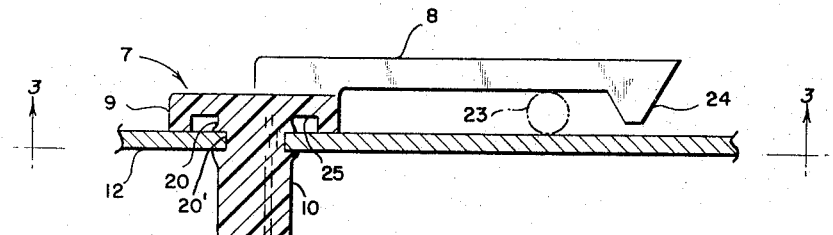

The stud as shown in FIG. 1 with the finger lever 8 integral with the stud and cap and of the same material may resiliently retain an article 23 on the plate 12 by a detent 24 on the lever. The cap 9 preferably is provided with an annular groove 25 to provide space at the shaft corners so that any upsetting of material thereat will not tend to urge the stud from the hole when the stud is turned to seating position.

While the finger lever and cap are frequently conveniently well suited to turn the shaft, they may be omitted, for the shaft may be turned as by a wrench or a gang of wrenches. For example, a plurality of electrical condenser plates 12a may be temporarily held in desired space relation with a metal shaft 10m passing through their respective holes. By using a gang of wrenches the shaft may be turned not only at an end but by a wrench between the plates. The shaft may be provided with a hexagonal head 7a bearing a threaded part 26 to carry a nut 28.

Thus far the invention has been described as a four-faced shaft, turnable in either direction, that is to say edge portions of the channel grooves 15 are symmetrical. The invention is not so limited however and the shaft may be three-faced as at 10a in FIG. 6 wherein the groove channels 15a have non-symmetrical side walls permitting far better action when the stud is turned in only one direction. By having the wall portion 20a of the grooves taper, the turning and displacing action can extend to about 45° before the abutment 21a engages the hole wall. Thus for the same amount of displaced material of the shaft a smaller turning force is required over the angular distance.

Figure 6:
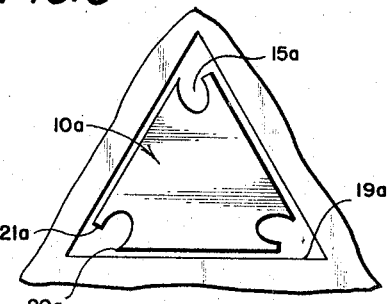
FIGS. 6 and 7 show respectively two different forms of three sided stems.
Figure 7:
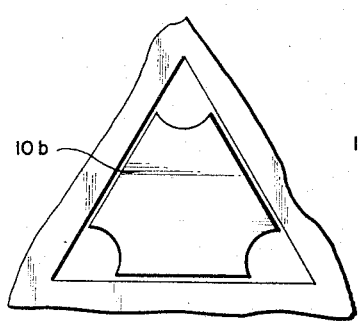
Figure 8:
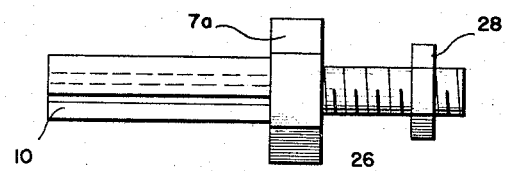
FIG. 8 shows a stem in combination with a bolt.

Symmetrically sided grooves such as 15 may be provided for the three-faced shaft 10b of FIG. 7 which provide similar action to that of FIG. 6 but in either direction and with reduced cross section.

The greater the number of faces and corresponding sides of the hole, the lesser the angular turn can be for displacing the same amount of material from non-symmetrical groove walls and consequently greater force is required to turn the shaft. This is due to the camming effect of the hole wall against the groove wall-part to displace the latter.

The invention claimed is:

1. In combination, a fastening device and a plate-like member, said fastening device comprising an elongated stem of slightly yieldable material having a plurality of planar side faces of substantially like width and uniformly situated about the longitudinal axis of the stem to define a generally polygonal cross-section, equi-angularly spaced radii from the axis of the stem at a point on the axis being perpendicular to the respective faces at longitudinal medial lines of the faces, the stem having a longitudinal groove at each corner thereof between the faces, the side walls of the grooves meeting their adjacent faces at least in alternate sequence at an acute angle, said plate-like member being of relatively non-yielding material and having a hole slightly greater than of similar geometric shape as the cross section of the stem, with planes of the faces extended to intersection, to receive said stem freely slidably therein, the size of the hole being small enough to prevent turning of the stem within the hole without deformation of the stem, so that when the stem is in the hole and turned under force, the material of the stem at side walls of the groove will yield and be forced into the groove in the zone of the plate-like member and leave stem edge portions for projecting laterally over at least three marginal portions of the hole, the stem being of greater length than the thickness of the plate-like member so that a portion of the stem may extend well through the plate-like member.

2. In combination as claimed in claim 1, said plate being of a plurality of spaced plates and the shaft engaging all plates in like manner.

3. A fastening device as claimed in claim 1, the width of the grooves relative to that of the faces being such that the stem must be turned of the order of 33° for the leading edge portions to engage the sides of the hole.

4. A fastening device as claimed in claim 1, said stem having only three faces.

References Cited
UNITED STATES PATENTS

| | | | |
|---|---|---|---|
| 813,093 | 2/1906 | Henn | 85—19 |
| 2,125,018 | 7/1938 | Hamill | 85—70 |
| 2,940,558 | 6/1960 | Schlueter | 189—36 |
| 2,949,142 | 8/1960 | Sumerak | 151—41.73 |
| 2,976,345 | 3/1961 | Whitted | 85—80 |

CARL W. TOMLIN, *Primary Examiner.*

R. S. BRITTS, G. A. MILWICK, *Assistant Examiners.*